United States Patent Office 2,775,892
Patented Jan. 1, 1957

2,775,892

APPARATUS FOR INDICATING THE STATE OF CHARGE OF BUNKERS

Franz Gödde, Essen, Germany, assignor, by mesne assignments, to Koppers Company, Inc., Pittsburgh, Pa., a corporation of Delaware Application February 13, 1953, Serial No. 334,893

5 Claims. (Cl. 73—304)

The present invention relates in general to an apparatus for measuring and indicating the state of charge of bunkers for liquid or solid material, particularly finely granular bulk material, and in particular to an apparatus for measuring and indicating the state of charge of a bunker through the dielectric and/or ohmic resistance of the charged material.

In hitherto known apparatus for measuring and indicating the state of charge of bunkers, which utilize the electrical properties of the charged material, disadvantages have existed because measurement and indication depended to a large degree upon the nature of the charged material especially, on its moisture content. This has been particularly so when coal dust with varying moisture contents has been the charged material, since known measuring devices of this kind arranged for a particular charged material could only be used for the selected charged material unless subsequently calibrated.

The present invention eliminates the aforementioned disadvantages in a comparatively simple way. It is known that practically all solid and liquid bodies have a dielectric and ohmic resistance which is very different from that of air at the same temperature. A potential applied to two electrodes will therefore create a very different electric current according to whether air or another material, e. g. coal dust, exists between the electrodes, and in the last case the current will be greater than with air. The absolute amount of the current naturally also depends on the chemical nature and the moisture of the material.

According to the present invention the new apparatus for indicating the state of charge of bunkers for solid or liquid charge material comprises at least one pair of electrode probes projecting into the chamber of a bunker at a selected charge measuring station in the bunker, the probes of the pair being so spaced as to permit bulk material charged into the bunker to penetrate freely between the space when sufficient quantities of material have accumulated within the bunker to reach the height of the probes; a thyratron tube having the grid connected to one probe of the electrode pair; a relay connected to the thyratron tube, the relay being so connected as to be actuated when the thyratron tube is fired; an indicating device connected to the relay adapted to be actuated by the relay; and a generator connected between the other probe of the electrode pair and the cathode of the thyratron adapted to deliver voltage to the probe whereby a current will pass between the space between the probes when material charged into the bunker displaces air in the space, thus causing the tube to fire and the indicating device to operate.

The operation of the thyratron is known in itself. The firing of the thyratron tube always takes place if the potential on the ignition grid exceeds a minimum value. The ion flow then building up in the tube is only slightly dependent on the grid potential on the ignition grid; provided that this potential does not fall below the minimum value necessary for ignition. If alternating potential is chosen as the anode potential for the thyratron then with a drop of the grid potential below the ignition potential value a momentary quenching of the tube will be assured with certainty. This property of the thyratron tube is now coupled in accordance with the invention with the above stated physical fact that all materials differ either as to their conductivity or as to their dielectric constant with air. For this purpose a voltage conducting probe or electrode, together with and in association with a probe connected to the control grid of the thyratron, is introduced, insulated, into the bunker to be supervised. As soon as the charge material of the bunker expels the air acting as an insulator or dielectric between the two probes, a current, even if only a small current, flows from the voltage carrying electrode through the ohmic or capacitative resistance of the charge material to the other electrode connected with the thyratron tube. If this current creates on the grid biasing resistance of the thyratron a potential exceeding the ignition limit the thyratron fires and the relay lying in the anode current circuit is switched. The sensitivity of response can be regulated with the help of a direct voltage on a second grid of the thyratron and adjusted to the most favourable value. Moreover the bias voltage on the second grid of the thyratron tube can be so adjusted that even with a charge material which gives a particularly small current between the electrodes the thyratron is securely fired.

The invention can be used to indicate merely the limits of the state of charge of the bunker, namely "empty" and/or "full." In this case two pairs of probes and two thyratrons would be needed, one for the upper and one for the lower measuring point.

It is, however, also possible to make the charge state indication finely graduated, i. e., to increase the number of the measuring points, which is above all of importance with larger structures. In order in such cases to avoid a separate thyratron being required for each pair of probes the invention provides an automatically operating switch which enables the state of the bunker to be supervised with the employment of only two thyratron tubes in any number of measuring points.

In the drawings two examples of construction of the invention are illustrated.

Figure 1:
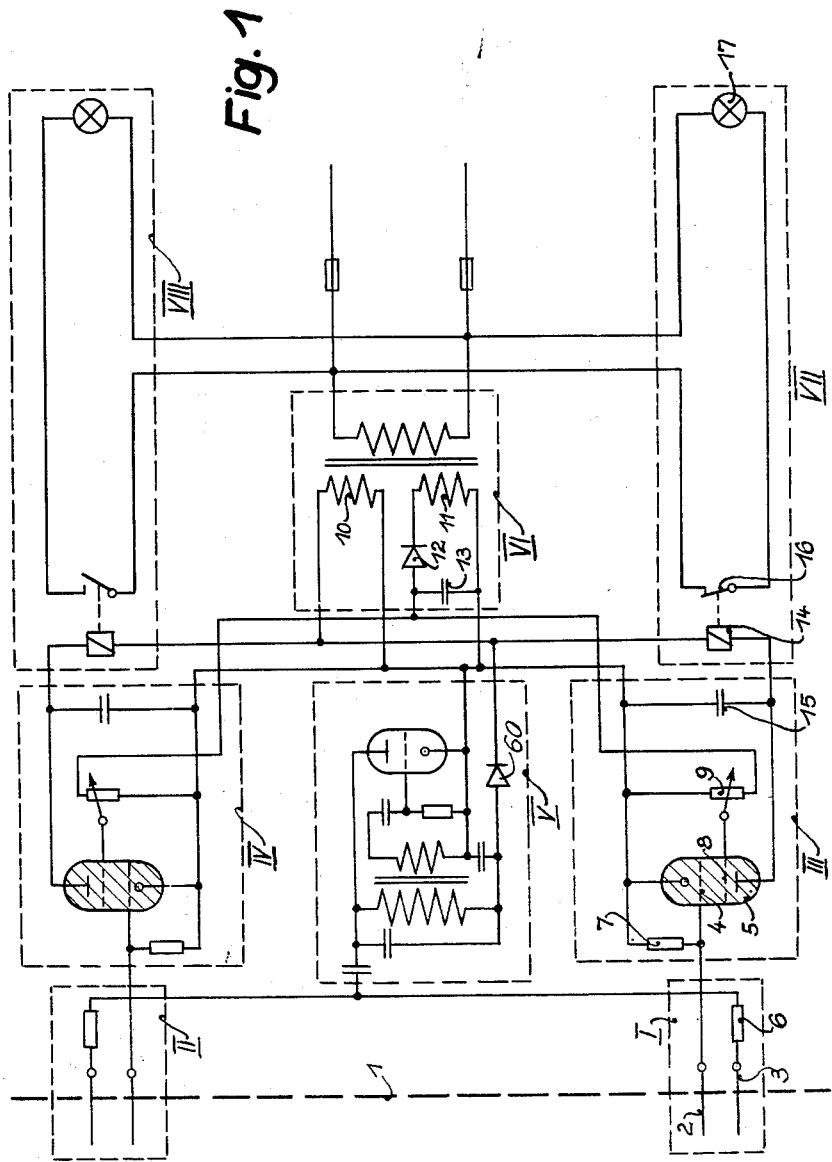
Fig. 1 shows the connection of the apparatus according to the invention for only two measuring points.

The apparatus shown in Fig. 1 for measuring the condition of the bunker at two points, for example at the bottom for the "empty" indication and at the top for the "full" indication consists of a plurality of assemblies, in fact the assemblies I and II, consisting of the measuring electrodes and the corresponding switch elements, the assemblies III and IV consisting each of a thyratron and the corresponding switch elements, the assembly V, consisting of the low frequency generator, the assembly VI consisting of the power supply part and the assemblies VII and VIII consisting each of a switch relay and the corresponding indicator device.

It is assumed that the bunker, of which one boundary wall is indicated by the line 1, is empty. The assembly I arranged near the outlet consists of the electrodes or probes 2 and 3, of which the probe 2 is connected with the ignition grid of the thyratron tube 5 and the other probe 3 through a protective resistance 6 with one side of the low frequency generator V, the energizing voltage of this generator being rectified through rectifier 60. The other side of generator V output is connected to the cathode of the thyratron tube 5 which, as aforementioned, has its ignition grid connected to probe 2, both sides of generator V output thus being so connected as to apply a potential between probes 2 and 3. The particular construction of the low frequency generator may be as desired and in the present case is unimportant as regards the method of operation of the device according to the invention. In the grid circuit of the ignition grid 4 there lies the grid leak resistance 7 on which forms the grid potential required for the control of the thyratron. The response sensitivity of the thyratron can be varied within wide limits by means of the adjustable continuous voltage supplied to the grid 8. The regulation of this continuous voltage is effected with the help of the potentiometer 9. The continuous voltage is taken from the supply device VI which contains in addition to the secondary winding 10 for the anode voltage of the thyratron tube a second secondary winding 11, the voltage of which is rectified with the help of the rectifier 12 and smoothed by the condenser 13.

So long as there is no bulk material in the bunker, air exists between the electrodes 2 and 3. The current flowing through the grid leak resistance 7 with the generator V switched on is very small as air is a good insulator and has a dielectric constant of practically 1. On this account there is no voltage on the grid which is sufficiently high to initiate the firing of the thyratron. If bulk goods, e. g., coal dust is delivered into the bunker it replaces the air in the space between the electrodes 2 and 3. An electric current then flows which has a strongly capacitative component and passes through the grid resistance 7 and produces such a potential drop on the grid resistance that the thyratron 5 fires. From the moment of ignition a pulsating anode direct current flows through the relay coil 14. The condenser 15 in the anode circuit of the thyratron serves to smooth the anode current, this being necessary in order that the relay 14 shall not flutter, but hold securely. The contact 16 of the relay 14 is normally closed, i. e., the signal lamp 17 lights and therefore indicates that the bunker is empty. In the case of ignition of the thyratron 5, the contact 16 is opened so that the lamp 17 is extinguished. Extinguishing the lamp is identical with the signal "filling of the bunker has begun."

In the course of further charging, the conditions with the constructional and switch groups or assemblies I, III and VII do not change further. When the charging material reaches the measuring probe group or assembly II, the thyratron of the group or assembly IV fires and the relay of the group or assembly VIII receives current, whereby the previously opened relay contact is closed and the corresponding signal lamp is now illuminated which is identical with the signal "bunker is filled."

When emptying the bunker, the operations are repeated but in the reverse sequence. The signal lamp currents may naturally be used in order in the known manner to set in operation, or to stop the charging devices for the bunker.

Figure 2:
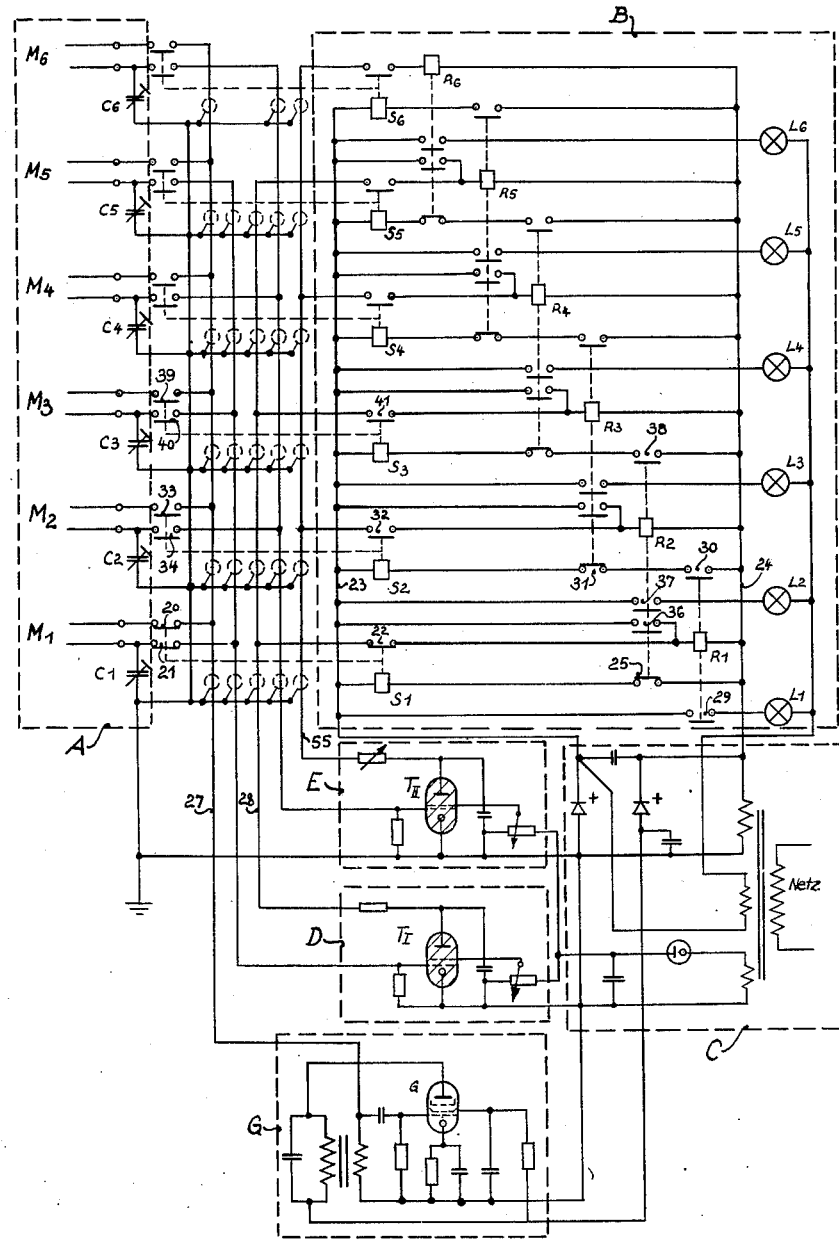
Fig. 2 shows the circuit for supervising the condition of the bunker at altogether six measuring points but with the employment of only two thyratron tubes.

With the switching device according to Fig. 2 the state of filling of the bunker is supervised and continuously indicated at six different points, so that it is possible to read off directly from the number of signal lamps to be illuminated, what is the height of the surface of the charging material in the bunker.

Also, with the switch device according to Fig. 2 the so-called switch groups or assemblies are provided, namely the switch group A, consisting of six pairs of measuring probes, the switch group B with the relays and signal lamps, the switch group C with the supply system and the rectifiers, the switch groups D and E with the thyratron $T_I$ and $T_{II}$ and the switch group G with the low frequency generator.

It will be assumed first of all that none of the pairs of measuring probes $M_1$–$M_6$ is influenced by the charging material. As the relay $R_2$ is without current, i. e., the contact 25 is closed, the relay coil $S_1$ is supplied with current which is produced by the voltage supplied by the supply device C to the bus bars 23 and 24. On this account the contacts 20, 21 and 22 are closed. The low frequency voltage from the generator G supplied to the one probe of the measuring head $M_1$ through the bus bar 27 and the contact 20 cannot pass to the second probe capacitatively earthed through the smoothing condenser $C_1$ so long as there is air between the probes. At the moment when charging material penetrates between the probes of the measuring head M there is produced a current which flows via the contact 21 to the switch group D and there effects in the above described manner the ignition of the thyratron $T_1$. There then flows from the anode of the thyratron $T_1$ through the connection a current which through the closed contact 22 energises the relay $R_1$, so that the contact 29 is closed. As a result the lamp $L_1$ is connected to the supply and thus indicates that the filling material has reached the measuring head $M_1$.

Upon the response of the relay $R_1$ as a result of the firing of thyratron $T_1$ the contact 30 is also closed. As a result the relay $S_2$ is connected to the bus bars 23 and 24 through the closed contact 31, and accordingly the contacts 32, 33 and 34 are closed. The generator G can now also supply the measuring head $M_2$ with low frequency voltage through the connection 27. If bulk material penetrates into the measuring head $M_2$ then a current flows from the measuring head $M_2$ through the contact 34 to the switch group E with the thyratron $T_{II}$. This fires and the resulting anode current flows through the connection 55 and the closed contact 32 to the relay $R_2$. As a result the contacts 36, 37 and 38 are closed and the contact 25 is opened. The signal lamp $L_2$ lights as a result of the closed contact 37 and thus indicates that the charging material has risen up to the measuring head $M_2$. The lamp $L_1$ remains switched in, however, since the relay $R_1$, in spite of the relay $S_1$ having fallen out as a result of interruption of the contact 25, remains connected in through the contact 36, so that the contact 29 does not open.

With the falling out of the relay $S_1$ the low frequency voltage of the generator G is removed from the measuring head as the contact 20 is opened and simultaneously the switch group D is separated with the thyratron T as the contact 21 is also interrupted. Instead of this the low frequency generator G is applied through the connection 27 to the measuring head $M_3$, as in the meantime the relay $S_3$ has acted and closed the contacts 39, 40 and 41. The switch group D is likewise automatically applied to the measuring head $M_3$.

From this point onwards the operations described for the measuring head $M_1$ and $M_2$ are repeated in a similar manner. According to the rise of the charging material in the bunker the signal lamps $L_3$–$L_6$ illuminate and there takes place automatically the change-over of the low frequency generator and one of the switch groups D and E in consecutive alternation. When the bunker is completely filled all the signal lamps light up. Upon emptying of the bunker all the signal lamps are extinguished, beginning at $L_6$, one after the other, until the extinguishing of the last signal lamp $L_1$ has indicated that the bunker is now empty.

It is clear that with this circuit the actuation of the limit signal lamps $L_1$ and $L_6$ can be used automatically to switch in devices which connect or disconnect the charging devices for the bunker.

I claim:

1. In combination with a bunker, a state of charge indicator for said bunker comprising: at least one electrode probe pair projecting into the chamber of said bunker at a selected charge measuring station, the probes of said pair being so spaced as to permit electrically conductive bulk material charged into said bunker to penetrate freely between said probes when sufficient quantities of material have accumulated within said bunker to reach the height of said probes; a thyratron tube having its grid connected to one probe of said electrode pair; a relay connected to the said thyratron tube, said relay being adapted to be actuated when said thyratron tube is fired; an indicating device connected to said relay adapted to be actuated by said relay; and a generator having one side connected to the cathode of said thyratron tube and the other side to the other probe of said electrode pair, adapted to deliver voltage to said probes whereby a current will pass between said probes when said charged material displaces air between said probes, thus causing said tube to fire and said indicating device to operate.

2. The apparatus of claim 1, and control means adapted to regulate the sensitivity of response of said thyratron in accordance with the material charged.

3. In combination with a bunker, a state of charge indicator for said bunker comprising: a plurality of electrode probe pairs projecting into the chamber of said bunker at selected vertically spaced charge measuring stations, the probes of each of said pairs being so spaced as to permit electrically conductive bulk material charged into said bunker to penetrate freely between said probes when sufficient quantities of material have accumulated within said bunker to reach the height of a probe pair; a pair of thyratron tubes, one of said tubes of said pair of thyratron tubes having its grid connected to one of the two probes of every alternate electrode probe pair of said plurality of electrode probe pairs and the other of the thyratron tubes having its grid connected to one of the two probes of the other remaining electrode probe pairs; a generator having one side connected to each of the other probes of every electrode pair and the other side connected to the cathodes of said thyratron tubes adapted to deliver voltage to each of said probes whereby a current will pass between said probes when said charged material displaces air between said probes, thus causing said tube to fire; a relay circuit adapted to connect said generator in sequence with said electrode pairs in accordance with the quantity of material in said bunker and adapted to connect the thyratrons of said thyratron pairs in alternation with successive electrode pairs; and an indicating device for each of said electrode pairs, adapted to be actuated when said relay circuit has connected said generator and one of said thyratrons with the electrode pairs with which said indicating device is associated.

4. The apparatus of claim 3, and a holding circuit adapted to hold said indicating device in indicated position upon actuation of following successive indicating devices.

5. The apparatus of claim 4, and control means adapted to regulate the sensitivity of response of said thyratron in accordance with the material charged.

References Cited in the file of this patent

UNITED STATES PATENTS

| | | |
|---|---|---|
| 2,230,137 | Ewertz | Jan. 28, 1941 |
| 2,233,297 | Polin et al. | Feb. 25, 1941 |
| 2,541,743 | Brockman et al. | Feb. 13, 1951 |